(12) United States Patent
Lee et al.

(10) Patent No.: US 11,524,492 B2
(45) Date of Patent: *Dec. 13, 2022

(54) POLYAMIDE RESIN COMPOSITION AND MOLDED ARTICLE COMPRISING THE SAME

(71) Applicant: Lotte Chemical Corporation, Seoul (KR)

(72) Inventors: Sang Hwa Lee, Uiwang-si (KR); Yeong Deuk Seo, Uiwang-si (KR); Kyoung Tae Youm, Uiwang-si (KR); Sang Hyun Hong, Uiwang-si (KR)

(73) Assignee: Lotte Chemical Corporation, Seoul (KR)

( * ) Notice: Subject to any disclaimer, the term of this patent is extended or adjusted under 35 U.S.C. 154(b) by 82 days.

This patent is subject to a terminal disclaimer.

(21) Appl. No.: 16/234,894

(22) Filed: Dec. 28, 2018

(65) Prior Publication Data

US 2019/0203046 A1 Jul. 4, 2019

(30) Foreign Application Priority Data

Dec. 31, 2017 (KR) .......................... 10-2017-0185031

(51) Int. Cl.
 *B32B 27/34* (2006.01)
 *C08L 77/06* (2006.01)

(52) U.S. Cl.
 CPC .............. *B32B 27/34* (2013.01); *C08L 77/06* (2013.01); *C08L 2205/025* (2013.01); *C08L 2205/03* (2013.01); *Y10T 428/31681* (2015.04)

(58) Field of Classification Search
 CPC ... B32B 27/34; B32B 2307/308; C08L 77/06; C08L 2201/08; C08K 9/04; C08K 2003/265; C08K 2201/003; Y10T 428/31725
 See application file for complete search history.

(56) References Cited

U.S. PATENT DOCUMENTS

| | | | |
|---|---|---|---|
| 3,484,403 A | 12/1969 | Brunson | |
| 3,877,965 A | 4/1975 | Broadbent et al. | |
| 4,552,626 A * | 11/1985 | Stevenson | C23C 18/22 205/168 |
| 4,780,505 A | 10/1988 | Mashita et al. | |
| 5,256,719 A | 10/1993 | Sham et al. | |
| 5,292,805 A | 3/1994 | Paschke et al. | |
| 5,324,766 A * | 6/1994 | Ikejiri et al. | H05K 1/0346 524/433 |
| 6,117,561 A | 9/2000 | Jacquement et al. | |
| 6,617,381 B1 * | 9/2003 | Kumaki et al. | C08K 7/04 524/112 |
| 9,845,389 B2 | 12/2017 | Harder et al. | |
| 9,932,444 B2 | 4/2018 | Washio et al. | |
| 10,450,460 B2 | 10/2019 | Kim et al. | |
| 2001/0003766 A1 | 6/2001 | Nozaki | |
| 2006/0100334 A1 * | 5/2006 | Ebert | C08K 3/26 524/425 |
| 2009/0127740 A1 | 5/2009 | Kirchner | |
| 2009/0142585 A1 | 6/2009 | Kobayashi et al. | |
| 2009/0143520 A1 * | 6/2009 | Elia | C25D 5/56 524/425 |
| 2010/0028602 A1 | 2/2010 | Naritomi et al. | |
| 2010/0160008 A1 | 6/2010 | Topoulos | |
| 2010/0237293 A1 | 9/2010 | Kirchner | |
| 2010/0324195 A1 | 12/2010 | Williamson | |
| 2012/0027983 A1 | 2/2012 | Elia | |
| 2012/0165445 A1 | 6/2012 | Lee et al. | |
| 2012/0196961 A1 | 8/2012 | Kobayashi et al. | |
| 2012/0196973 A1 | 8/2012 | Doshi et al. | |
| 2013/0165599 A1 | 6/2013 | Je et al. | |
| 2013/0209784 A1 | 8/2013 | Nakagawa et al. | |
| 2013/0237658 A1 | 9/2013 | Eguchi et al. | |
| 2014/0066561 A1 | 3/2014 | Pfleghar et al. | |
| 2014/0179851 A1 | 6/2014 | Pfleghar et al. | |
| 2014/0179866 A1 | 6/2014 | Pfleghar et al. | |

(Continued)

FOREIGN PATENT DOCUMENTS

| | | |
|---|---|---|
| CN | 101861358 A | 10/2010 |
| CN | 101878252 A | 11/2010 |
| CN | 102264839 A | 11/2011 |
| CN | 102532887 A | 7/2012 |
| CN | 103003046 A | 3/2013 |
| CN | 103044905 A | 4/2013 |
| CN | 103339201 A | 10/2013 |
| CN | 103881368 A | 6/2014 |
| CN | 104725837 A | 6/2015 |

(Continued)

OTHER PUBLICATIONS

Machine translation of KR20170099297. (Year: 2017).*

(Continued)

*Primary Examiner* — John D Freeman
(74) *Attorney, Agent, or Firm* — Additon, Pendleton & Witherspoon, P.A.

(57) ABSTRACT

A polyamide resin composition and a molded article manufactured using the same. The polyamide resin composition includes: about 15 wt % to about 49 wt % of an aromatic polyamide resin including a repeat unit represented by Formula 1 and a repeat unit represented by Formula 2 as defined in the specification; about 1 wt % to about 30 wt % of a polyamide resin having a glass transition temperature of about 40° C. to about 120° C.; about 1 wt % to about 20 wt % of an olefin-based copolymer; and about 30 wt % to about 50 wt % of calcium carbonate. The polyamide resin composition and the molded article produced using the same can have good properties in terms of plating adhesion, impact resistance, thermal resistance, fluidity, and/or appearance, and the like.

13 Claims, 1 Drawing Sheet

(56) References Cited

U.S. PATENT DOCUMENTS

| | | | |
|---|---|---|---|
| 2015/0175804 A1* | 6/2015 | Aepli | C08K 3/32 |
| | | | 428/35.7 |
| 2015/0274968 A1 | 10/2015 | Bayer et al. | |
| 2015/0329670 A1 | 11/2015 | Washio et al. | |
| 2016/0083509 A1 | 3/2016 | Im et al. | |
| 2016/0102202 A1* | 4/2016 | Lamberts | C08L 77/00 |
| | | | 524/413 |
| 2016/0130439 A1 | 5/2016 | Koch et al. | |
| 2016/0369097 A1 | 12/2016 | Lee et al. | |
| 2018/0244917 A1 | 8/2018 | Kim et al. | |
| 2018/0244919 A1 | 8/2018 | Kim et al. | |
| 2019/0077957 A1 | 3/2019 | Tamada et al. | |
| 2019/0127579 A1* | 5/2019 | Kim | C08L 77/10 |
| 2019/0202186 A1 | 7/2019 | Lee et al. | |
| 2021/0214555 A1 | 7/2021 | Seo et al. | |

FOREIGN PATENT DOCUMENTS

| | | | | |
|---|---|---|---|---|
| CN | 104797631 | A | 7/2015 | |
| CN | 104854192 | A | 8/2015 | |
| CN | 105504800 | A | 4/2016 | |
| CN | 106046781 | A | 10/2016 | |
| EP | 0368281 | A1 | 5/1990 | |
| EP | 0572266 | A2 | 12/1993 | |
| EP | 0690098 | A2 | 1/1996 | |
| EP | 2918624 | A1 | 9/2015 | |
| JP | 2003-112920 | A | 4/2003 | |
| JP | 2013-203851 | A | 10/2013 | |
| JP | 2014-173057 | A | 9/2014 | |
| JP | 2017-171879 | A | 9/2017 | |
| KR | 10-2010-0123178 | A | 11/2010 | |
| KR | 10-2013-0072513 | A | 7/2013 | |
| KR | 10-2013-0132437 | A | 12/2013 | |
| KR | 10-2014-0108517 | A | 9/2014 | |
| KR | 10-2016-0035954 | A | 4/2016 | |
| KR | 10-2017-0024201 | A | 3/2017 | |
| KR | 10-2017-0026833 | A | 3/2017 | |
| KR | 10-2017-099297 | A | 8/2017 | |
| KR | 2017099297 | A * | 8/2017 | ............. B62D 25/10 |
| WO | 2014/073219 | A1 | 5/2014 | |
| WO | 2017/034295 | A1 | 3/2017 | |
| WO | 2019/231160 | A1 | 12/2019 | |

OTHER PUBLICATIONS

Office Action in counterpart Korean Application No. 10-2017-0185031 dated Dec. 5, 2019, pp. 1-5.
Office Action in commonly owned Chinese Application No. 201680048870.3 dated Aug. 16, 2019, pp. 1-6.
Office Action in commonly owned U.S. Appl. No. 15/754,328 dated Sep. 5, 2019, pp. 1-18.
Office Action in commonly owned Korean Application No. 10-2018-0139660 dated Sep. 7, 2020, pp. 1-5.
Supplementary Search Report in commonly owned European Application No. 16839584.6 dated Apr. 16, 2019, pp. 1-7.
International Search Report in commonly owned International Application No. PCT/KR2016/009307, dated Nov. 16, 2016, pp. 1-6.
Non-Final Office Action in commonly owned U.S. Appl. No. 15/754,328 dated May 8, 2019, pp. 1-18.
Office Action in commonly owned Chinese Application No. 201811617729.8 dated Dec. 21, 2020, pp. 1-6.
Office Action in counterpart Chinese Application No. 201811635926.2 dated Jan. 28, 2021, pp. 1-10.
Final Office Action in commonly owned U.S. Appl. No. 16/233,156 dated Nov. 17, 2021, pp. 1-9.
Bartczak et al., "Toughness mechanism in semi-crystalline polymer blends: II. High-density polyethylene toughened with calcium carbonate filler particles", Polymer 40 (1999) pp. 2347-2365.
Nylon 6T—Polymer Properties Database, Semi-aromatic polyamides (6T, DT, 6I), (Year: 2020), pp. 1-2.
Kim—KR 2017-0024201 A MT-KOR#1—2017, pp. 1-14.
Kim KR 2017-0026833 A—MT-KOR#2—aromatic+aliphatic polyamide+chelating agent—2017, pp. 1-16.
Office Action in commonly owned Chinese Application No. 201811247837.0 dated Nov. 17, 2020, pp. 1-8.
Xia Shengli et al., "Properties of PA66/EPDM-g-MAH/CaCO3 Composites" Department of Chemical and Biological Engineering, Nantong Vocational University, Nantong, China, vol. 45, No. 10, Oct. 2017, pp. 119-125.
International Search Report in commonly owned International Application No. PCT/KR2019/006091 dated Aug. 22, 2019, pp. 1-6.
Non-Final Office Action in commonly owned U.S. Appl. No. 16/233,156 dated Oct. 29, 2020, pp. 1-10.
Non-Final Office Action in commonly owned U.S. Appl. No. 16/233,156 dated May 19, 2021, pp. 1-6.
Advisory Action in commonly owned U.S. Appl. No. 16/233,156 dated Feb. 7, 2022, pp. 1-4.
Advisory Action in commonly owned U.S. Appl. No. 16/170,190 dated Mar. 2, 2022, pp. 1-6.
Non-Final Office Action in commonly owned U.S. Appl. No. 16/170,190 dated Sep. 10, 2020, pp. 1-17.
Final Office Action in commonly owned U.S. Appl. No. 16/170,190 dated Jan. 8, 2021, pp. 1-14.
Advisory Action in commonly owned U.S. Appl. No. 16/170,190 dated Mar. 17, 2021, pp. 1-8.
Non-Final Office Action in commonly owned U.S. Appl. No. 16/170,190 dated Jun. 29, 2021, pp. 1-18.
Final Office Action in commonly owned U.S. Appl. No. 16/170,190 dated Oct. 12, 2021, pp. 1-16.
Office Action in commonly owned U.S. Appl. No. 16/170,190 dated Apr. 29, 2022, pp. 1-20.
Yamada—JP 2017-171879 A Biblio—aromatic PA+aliphatic PA + PE wax + calcium carb 1-50 um—Sep. 28, 2017 (Year: 2017) pp. 1.
Notice of Allowance in commonly owned U.S. Appl. No. 16/170,190 dated Oct. 17, 2022, pp. 1-20.

* cited by examiner

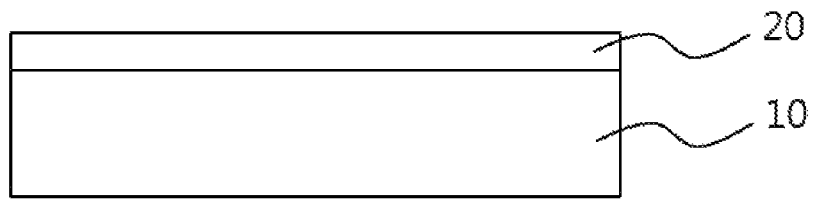

POLYAMIDE RESIN COMPOSITION AND MOLDED ARTICLE COMPRISING THE SAME

CROSS-REFERENCE TO RELATED APPLICATION

This application claims priority under 35 USC Section 119 to and the benefit of Korean Patent Application No. 10-2017-0185031, filed Dec. 31, 2017, the entire disclosure of which is incorporated herein by reference.

FIELD

The present disclosure relates to a polyamide resin composition and a molded article comprising the same.

BACKGROUND

An aromatic polyamide resin, such as a polyphthalamide resin, has a lower specific gravity than glass or metal and exhibits good properties in terms of thermal resistance, wear resistance, and chemical resistance. With such advantages, the aromatic polyamide resin is used for housings of electric/electronic products, internal/external materials for automobiles and buildings, and the like. In particular, with a recent trend toward weight reduction and compactness of products, plastic products manufactured using thermoplastic resins are rapidly replacing glass or metal products.

In addition, in order to realize such advantages of a polyamide resin while maintaining an aesthetically pleasing appearance by providing metallic appearance, a technique for plating the polyamide resin has been developed. Plating of the polyamide resin is performed for the purpose of decoration and corrosion resistance, and secures good properties in terms of plating appearance and adhesion (plating adhesion and wettability) between a plating layer and a resin.

To this end, there is developed a method of adding an inorganic material or an epoxy group-containing polyolefin to a polyamide resin composition in order to improve wettability. However, this method can deteriorate impact resistance of the resin composition and thus allows a limited range of application thereof. In addition, although a method of alloying a polyamide resin with an acrylonitrile-butadiene-styrene (ABS) resin or a polycarbonate resin has been suggested in order to improve wettability of the resin composition, this method can deteriorate thermal resistance of the resin composition.

Therefore, there is a need for a polyamide resin composition that can secure good properties in terms of plating adhesion (wettability), impact resistance, thermal resistance, fluidity, and/or appearance, and the like.

SUMMARY OF THE INVENTION

The present disclosure relates to a polyamide resin composition that can have good properties in terms of plating adhesion, impact resistance, thermal resistance, fluidity, and/or appearance and the like, and a molded article formed of the same.

The polyamide resin composition may include: about 15 wt % to about 49 wt % of an aromatic polyamide resin including a repeat unit represented by Formula 1 and a repeat unit represented by Formula 2; about 1 wt % to about 30 wt % of a polyamide resin having a glass transition temperature of about 40° C. to about 120° C.; about 1 wt % to about 20 wt % of an olefin-based copolymer; and about 30 wt % to about 50 wt % of calcium carbonate:

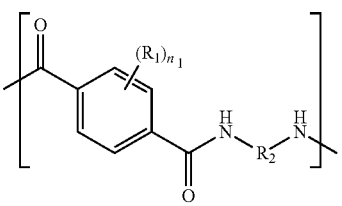
[Formula 1]

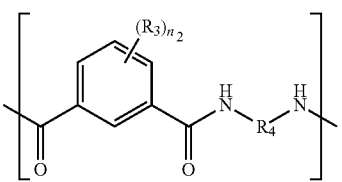
[Formula 2]

wherein $R_1$ and $R_3$ are the same or different and are each independently a $C_1$ to $C_6$ hydrocarbon group or a halogen atom; $R_2$ and $R_4$ are the same or different and are each independently a $C_6$ to $C_{12}$ linear or branched alkylene group; and $n_1$ and $n_2$ are the same or different and are each independently an integer of 0 to 4.

The aromatic polyamide resin may include about 60 mol % to about 80 mol % of the repeat unit represented by Formula 1 and about 20 mol % to about 40 mol % of the repeat unit represented by Formula 2.

The aromatic polyamide resin may have a glass transition temperature of about 130° C. to about 150° C.

The polyamide resin having a glass transition temperature of about 40° C. to about 120° C. may include an aliphatic polyamide resin, an amorphous polyamide resin, and/or an aromatic polyamide resin including an aliphatic dicarboxylic acid unit.

The aliphatic polyamide resin may include polyamide 6, polyamide 11, polyamide 12, polyamide 46, polyamide 66, polyamide 610, polyamide 612, polyamide 1010, polyamide 1012, and/or polyamide 1212.

A weight ratio of the aromatic polyamide resin to the polyamide resin having a glass transition temperature of about 40° C. to about 120° C. may range from about 4:1 to about 10:1.

The olefin-based copolymer may include an ethylene-α-olefin copolymer; and/or a modified ethylene-α-olefin copolymer obtained by graft polymerization of at least one compound of an α,β-unsaturated dicarboxylic acid and an α,β-unsaturated dicarboxylic acid derivative to the ethylene-α-olefin copolymer.

The at least one compound of the α,β-unsaturated dicarboxylic acid and the α,β-unsaturated dicarboxylic acid derivative may include at least one of maleic acid, maleic anhydride, maleic hydrazide, dichloromaleic anhydride, and/or fumaric acid.

The olefin-based copolymer may include a maleic anhydride modified ethylene-octene copolymer.

The polyamide resin composition may have a plating adhesive strength of about 13 N/cm to about 30 N/cm, as measured on an injection-molded specimen plated with a 30 μm thick chromium layer and having a size of 10 cm×10 cm×3.2 mm at a peeling rate of 50 mm/min using a tensile tester in accordance with JIS C6481.

The polyamide resin composition may have a notched Izod impact strength of about 4 kgf·cm/cm to about 12 kgf·cm/cm, as measured on a ⅛" thick specimen in accordance with ASTM D256.

The polyamide resin composition may have a heat deflection temperature (HDT) of about 100° C. to about 150° C., as measured under a load of 18.56 kgf/cm² at a heating rate of 120° C./hr in accordance with ASTM D648.

The present disclosure also relates to a molded article. The molded article includes: a base layer; and a plating layer formed on at least one surface of the base layer, wherein the base layer is formed of the polyamide resin composition set forth above.

BRIEF DESCRIPTION OF THE DRAWINGS

FIG. 1 is a schematic sectional view of a molded article according to one embodiment of the present invention.

DETAILED DESCRIPTION

The above and other aspects, features, and advantages of the present invention will become apparent from the detailed description of the following embodiments in conjunction with the accompanying drawings. It should be understood that the present invention is not limited to the following embodiments and may be embodied in different ways by those skilled in the art without departing from the scope of the present invention. Rather, the embodiments are provided for complete disclosure and to provide thorough understanding of the present invention by those skilled in the art. The scope of the present invention should be defined only by the appended claims.

A polyamide resin composition according to the present disclosure includes: (A) an aromatic polyamide resin; (B) a polyamide resin having a glass transition temperature of about 40° C. to about 120° C.; (C) an olefin-based copolymer; and (D) calcium carbonate.

(A) Aromatic Polyamide Resin

According to the present disclosure, the aromatic polyamide resin includes a repeat unit represented by Formula 1 and a repeat unit represented by Formula 2 to improve plating adhesion and/or thermal resistance of the resin composition (molded article):

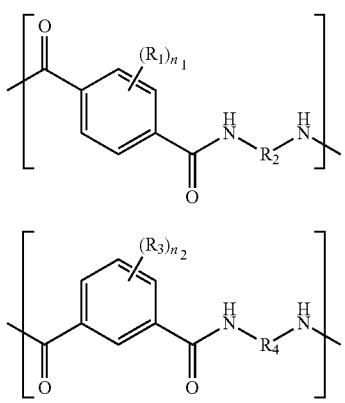

wherein $R_1$ and $R_3$ are the same or different and are each independently a $C_1$ to $C_6$ hydrocarbon group or a halogen atom; $R_2$ and $R_4$ are the same or different and are each independently a $C_6$ to $C_{12}$ linear or branched alkylene group; and $n1$ and $n2$ are the same or different and are each independently an integer of 0 to 4.

As used herein, the term hydrocarbon group refers to a $C_1$ to $C_6$ linear, branched, or cyclic, saturated or unsaturated, alkyl group.

The aromatic polyamide resin may include about 60 mol % to about 80 mol %, for example, about 65 mol % to about 75 mol %, of the repeat unit represented by Formula 1, and about 20 mol % to about 40 mol %, for example, about 25 mol % to about 35 mol %, of the repeat unit represented by Formula 2.

In some embodiments, the polyamide resin can include the repeat unit represented by Formula 1 in an amount of about 60, 61, 62, 63, 64, 65, 66, 67, 68, 69, 70, 71, 72, 73, 74, 75, 76, 77, 78, 79, or 80 mol % based on the total mol % (100 mol %) of the polyamide resin. Further, according to some embodiments, the repeat unit represented by Formula 1 may be present in an amount of from about any of the foregoing amounts to about any other of the foregoing amounts.

In some embodiments, the polyamide resin can include the repeat unit represented by Formula 2 in an amount of about 20, 21, 22, 23, 24, 25, 26, 27, 28, 29, 30, 31, 32, 33, 34, 35, 36, 37, 38, 39, or 40 mol % based on the total mol % (100 mol %) of the polyamide resin. Further, according to some embodiments, the repeat unit represented by Formula 2 may be present in an amount of from about any of the foregoing amounts to about any other of the foregoing amounts.

Within this content range, the polyamide resin composition can exhibit good plating adhesion and/or thermal resistance.

The aromatic polyamide resin may be prepared through polymerization of a dicarboxylic acid component comprising about 60 mol % to about 80 mol %, for example, about 65 mol % to about 75 mol %, of terephthalic acid, in which a hydrogen atom in a phenylene group is substituted or unsubstituted with $R_1$, and/or an ($C_1$ to $C_{10}$) alkyl ester thereof, and about 20 mol % to about 40 mol %, for example, about 25 mol % to about 35 mol %, of isophthalic acid, in which in which a hydrogen atom in a phenylene group is substituted or unsubstituted with $R_3$, and/or an ($C_1$ to $C_{10}$) alkyl ester thereof; and a $C_6$ to $C_{12}$ linear and/or branched alkylene group-containing aliphatic diamine component, for example hexane-1,6-diamine (hexamethylenediamine, HMDA), heptane-1,7-diamine, octane-1,8-diamine, nonane-1,9-diamine, decane-1,10-diamine, undecane-1,11-diamine, and/or dodecane-1,12-diamine, and the like by a method known in the art.

The aromatic polyamide resin may have a glass transition temperature of about 130° C. to about 150° C., for example, about 130° C. to about 140° C., as measured using a differential scanning calorimeter (DSC). Within this range, the polyamide resin composition can exhibit good properties in terms of thermal resistance and/or rigidity, and the like.

In addition, the aromatic polyamide resin may have an intrinsic viscosity (η) of about 0.7 dL/g to about 1.0 dL/g, for example, about 0.8 dL/g to about 0.9 dL/g, as measured using an Ubbelohde viscometer at 25° C. after being dissolved to a concentration of 0.5 g/dL in a sulfuric acid solution (98%). Within this range, the polyamide resin composition can exhibit good processability and/or appearance.

The polyamide resin composition can include the aromatic polyamide resin in an amount of about 15 to about 49 wt %, for example, about 30 to about 48 wt %, and as another example about 40 to about 47 wt %, based on 100 wt % of the polyamide resin composition. In some embodiments, the polyamide resin composition can include the aromatic polyamide resin in an amount of about 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, or 49 wt % based on 100 wt % of the polyamide resin composition. Further, according to some embodiments, the aromatic polyamide resin may be present in an amount of from about any of the foregoing amounts to about any other of the foregoing amounts.

If the content of the aromatic polyamide resin is less than about 15 wt %, the polyamide resin composition can suffer from deterioration in plating adhesion, thermal resistance, processability, rigidity, and/or impact resistance, and the like, and if the content of the aromatic polyamide resin exceeds about 49 wt %, the polyamide resin composition can suffer from deterioration in plating adhesion, fluidity, and/or processability, and the like.

(B) Polyamide resin having a glass transition temperature of about 40° C. to about 120° C.

The polyamide resin having a glass transition temperature of about 40° C. to about 120° C. serves to improve appearance, fluidity, and/or plating adhesion of the polyamide resin composition together with the aromatic polyamide resin, and may be a typical polyamide resin having a glass transition temperature of about 40° C. to about 120° C., as measured using a differential scanning calorimeter.

The polyamide resin having a glass transition temperature of about 40° C. to about 120° C. may include an aliphatic polyamide resin, an amorphous polyamide resin, an aromatic polyamide resin including an aliphatic dicarboxylic acid unit, and combinations thereof, all of which have a glass transition temperature within the above range. Examples of the aliphatic polyamide resin may include without limitation polyamide 6, polyamide 11, polyamide 12, polyamide 46, polyamide 66, polyamide 610, polyamide 612, polyamide 1010, polyamide 1012, polyamide 1212, and combinations thereof.

The polyamide resin having a glass transition temperature of about 40° C. to about 120° C. may have an intrinsic viscosity (η) of about 0.5 dL/g to about 2.0 dL/g, for example, about 0.7 dL/g to about 1.5 dL/g, as measured using an Ubbelohde viscometer at 25° C. after being dissolved to a concentration of 0.5 g/dL in a sulfuric acid solution (98%). Within this range, the polyamide resin composition can exhibit good properties in terms of processability, appearance, and/or plating adhesion, and the like.

The polyamide resin composition can include the polyamide resin having a glass transition temperature of about 40° C. to about 120° C. in an amount of about 1 wt % to about 30 wt %, for example, about 3 wt % to about 20 wt %, and as another example about 5 wt % to about 10 wt %, based on 100 wt % of the polyamide resin composition. In some embodiments, the polyamide resin composition can include the polyamide resin having a glass transition temperature of about 40° C. to about 120° C. in an amount of about 1, 2, 3, 4, 5, 6, 7, 8, 9, 10, 11, 12, 13, 14, 15, 16, 17, 18, 19, 20, 21, 22, 23, 24, 25, 26, 27, 28, 29, or 30 wt % based on 100 wt % of the polyamide resin composition. Further, according to some embodiments, the polyamide resin having a glass transition temperature of about 40° C. to about 120° C. may be present in an amount of from about any of the foregoing amounts to about any other of the foregoing amounts.

If the content of the polyamide resin having a glass transition temperature of about 40° C. to about 120° C. is less than about 1 wt %, the polyamide resin composition can suffer from deterioration in plating adhesion, fluidity, and/or appearance, and the like, and if the content of the polyamide resin exceeds about 30 wt %, the polyamide resin composition can suffer from deterioration in plating adhesion, thermal resistance, injection moldability, and/or compatibility (dispersion of inorganic materials), and the like.

The weight ratio (A:B) of the aromatic polyamide resin (A) to the polyamide resin (B) may range from about 4:1 to about 10:1. In some embodiments, the weight ratio (A:B) of the aromatic polyamide resin (A) to the polyamide resin (B) may be about 4:1, 5:1, 6:1, 7:1, 8:1, 9:1, or 10:1. Within this range, the polyamide resin composition can exhibit better properties in terms of plating adhesion, appearance, and/or moldability, and the like.

(C) Olefin-Based Copolymer

According to the present disclosure, the olefin-based copolymer is used together with the aromatic polyamide resin and the polyamide resin having a glass transition temperature of about 40° C. to about 120° C. to improve plating adhesion (wettability) between a plating layer and a molded article produced from the polyamide resin composition upon plating of the molded article while improving impact resistance of the polyamide resin composition. The olefin-based copolymer may be a copolymer of olefin-based monomers and/or a copolymer of an olefin-based monomer and an acrylic monomer.

The olefin-based monomer may be a $C_1$ to $C_{19}$ alkylene and may include, for example, ethylene, propylene, isopropylene, butylene, isobutylene, octene, and combinations thereof, and the acrylic monomer may include alkyl (meth) acrylic esters. Here, the term alkyl means a $C_1$ to $C_{10}$ alkyl group and examples of the alkyl (meth)acrylic esters may include without limitation methyl (meth)acrylate, ethyl (meth)acrylate, propyl (meth)acrylate, and/or butyl (meth) acrylate, and the like.

The olefin-based copolymer may include an ethylene-α-olefin copolymer or a modified ethylene-α-olefin copolymer obtained through graft polymerization of at least one compound of an α,β-unsaturated dicarboxylic acid and an α,β-unsaturated dicarboxylic acid derivative to the ethylene-α-olefin copolymer.

The at least one compound of the α,β-unsaturated dicarboxylic acid and the α,β-unsaturated dicarboxylic acid derivative may include at least one of maleic acid, maleic anhydride, maleic hydrazide, dichloromaleic anhydride, fumaric acid. For example, maleic acid and/or maleic anhydride can be used.

The olefin-based copolymer may be a maleic anhydride modified ethylene-octene copolymer. In this embodiment, the olefin-based copolymer can have good compatibility between the aromatic polyamide resin and the polyamide resin having a glass transition temperature of about 40° C. to about 120° C. and/or can significantly improve plating adhesion.

The polyamide resin composition can include the olefin-based copolymer in an amount of about 1 wt % to about 20 wt %, for example, about 5 wt % to about 15 wt %, based on 100 wt % of the polyamide resin composition. In some embodiments, the polyamide resin composition can include the olefin-based copolymer in an amount of about 1, 2, 3, 4, 5, 6, 7, 8, 9, 10, 11, 12, 13, 14, 15, 16, 17, 18, 19, or 20 wt % based on 100 wt % of the polyamide resin composition. Further, according to some embodiments, the olefin-based copolymer may be present in an amount of from about any of the foregoing amounts to about any other of the foregoing amounts.

If the content of the olefin-based copolymer is less than about 1 wt %, the polyamide resin composition can suffer from deterioration in plating adhesion and/or impact resistance, and the like, and if the content of the olefin-based copolymer exceeds about 20 wt %, the polyamide resin composition can suffer from deterioration in thermal resistance and/or rigidity, and the like.

(D) Calcium Carbonate

According to the present disclosure, the calcium carbonate promotes effective anchoring of a catalyst during a plating process, thereby significantly improving plating adhesion of the polyamide resin composition while improving appearance thereof. Spherical and/or powdery calcium carbonate may be used.

The calcium carbonate may have an average particle diameter D50 (a diameter at a distribution rate of 50%) of about 0.05 μm to about 6 μm, for example, about 1 μm to about 4 μm, as measured using a particle size analyzer.

Within this range of average particle diameter, the polyamide resin composition can exhibit good properties in terms of plating adhesion and/or appearance, and the like.

The polyamide resin composition can include the calcium carbonate in an amount of about 30 wt % to about 50 wt %, for example, about 35 wt % to about 45 wt %, based on 100 wt % of the polyamide resin composition. In some embodiments, the polyamide resin composition can include the calcium carbonate in an amount of about 30, 31, 32, 33, 34, 35, 36, 37, 38, 39, 40, 41, 42, 43, 44, 45, 46, 47, 48, 49, or 50 wt % based on 100 wt % of the polyamide resin composition. Further, according to some embodiments, the calcium carbonate may be present in an amount of from about any of the foregoing amounts to about any other of the foregoing amounts.

If the content of the calcium carbonate is less than about 30 wt %, the polyamide resin composition can suffer from deterioration in plating adhesion and/or mechanical properties (rigidity and the like), and if the content of the calcium carbonate exceeds about 50 wt %, the polyamide resin composition can suffer from deterioration in impact resistance and the like.

The polyamide resin composition according to one embodiment of the disclosure may further optionally include one or more than one of typical additives included in a typical thermoplastic resin composition. Examples of the additives may include flame retardants, lubricants, plasticizers, heat stabilizers, antioxidants, photostabilizers, colorants, and mixtures thereof, without being limited thereto. The additives may be present in amount of about 0.001 to about 40 parts by weight, for example, about 0.1 to about 10 parts by weight relative to about 100 parts by weight of the polyamide resin composition.

The polyamide resin composition according to one embodiment of the disclosure may be prepared in pellet form by mixing the components described above, followed by melt kneading through a typical twin-screw extruder at about 200° C. to about 350° C., for example, about 250° C. to about 300° C.

The polyamide resin composition may have a plating adhesive strength of about 13 N/cm to about 30 N/cm, for example, about 15 N/cm to about 25 N/cm, as measured on an injection-molded specimen plated with a 30 μm thick chromium layer and having a size of 10 cm×10 cm×3.2 mm at a peeling rate of 50 mm/min using a tensile tester in accordance with JIS C6481.

The polyamide resin composition may have a notched Izod impact strength of about 4 kgf·cm/cm to about 12 kgf·cm/cm, for example, about 5.5 kgf·cm/cm to about 10 kgf·cm/cm, as measured on a ⅛" thick specimen in accordance with ASTM D256.

The polyamide resin composition may have a heat deflection temperature (HDT) of about 100° C. to about 150° C., for example, about 115° C. to about 135° C., as measured under a load of 18.56 kgf/cm$^2$ at a heating rate of 120° C./hr in accordance with ASTM D648.

FIG. 1 is a schematic view of a molded article according to one embodiment of the present disclosure. It should be noted that the drawing is exaggerated in thickness of lines and/or size of components for descriptive convenience and clarity only. In addition, it should be understood that the present disclosure is not limited to the drawings and may be realized in various shapes. As shown in FIG. 1, the molded article according to the embodiment of the disclosure includes a base layer 10; and a plating layer 20 formed on at least one surface of the base layer 10, wherein the base layer 10 is formed of the polyamide resin composition according to the present disclosure.

In some embodiments, the base layer 10 may be formed in various shapes from the polyamide resin composition by various molding methods, such as injection molding, extrusion molding, vacuum molding, casting, and the like. Such molding methods are well known to those skilled in the art.

In some embodiments, the plating layer 20 may be formed by a typical method for manufacturing a plated plastic product. For example, the plating layer 20 may be formed by etching the base layer 10 and forming an anchor on an etched region, followed by plating, for example, electroless plating and/or electric plating, without being limited thereto.

In other embodiments, plating may be performed by typical wet plating and/or dry plating such as chemical vapor deposition (CVD), physical vapor deposition (PVD), plasma CVD, and/or spray coating, in addition to electroless plating and/or electric plating.

In addition, a plating process according to the present disclosure may be a plating process applicable to a base layer formed of typical ABS and/or PC/ABS, and the like. Typically, since a base layer formed of a polyamide resin composition suffers from a high defect rate upon etching with a typical etching solution, the base layer formed of the polyamide resin composition requires an exclusive etching solution and an exclusive plating line, thereby causing increase in manufacturing costs. However, the base layer formed of the polyamide resin composition according to the present disclosure allows plating using an existing plating line and an existing etching solution without causing such problems.

In some embodiments, the plating layer 20 may include at least one of chromium, nickel and/or copper, and may have a thickness of about 0.1 μm to about 100 μm, without being limited thereto.

The molded article can exhibit good plating adhesion between the base layer and the plating layer, and can secure good properties of the base layer in terms of appearance, impact resistance, and/or thermal resistance. Thus, the molded article can be advantageously used as interior/exterior materials having a metallic appearance for automobiles, electronic/electric products, and/or office equipment, without being limited thereto.

Next, the present invention will be described in more detail with reference to the following examples. However, it should be understood that these examples are provided for illustration only and are not to be construed in any way as limiting the present invention.

EXAMPLES

Details of components used in Examples and Comparative Examples are as follows.

(A) Aromatic Polyamide Resin

Polyamide 6T/6I (Product Name: A8002, 6T:6I (mole ratio)=70:30, glass transition temperature (Tg): 130° C., intrinsic viscosity [η]: 0.88 dL/g, Solvay) is used.

(B1) A polyamide resin having a glass transition temperature of 50° C. (polyamide 66, Product Name: 23AE1K, intrinsic viscosity [η]: 1.03 dL/g, Solvay) is used.

(B2) A polyamide resin having a glass transition temperature of 55° C. (polyamide 612, Product Name: PA612, intrinsic viscosity [η]: 1.06 dL/g, Shandong Dongchen New Technology Co., Ltd.) is used.

(B3) A polyamide resin having a glass transition temperature of 48° C. (polyamide 1012, Product Name: PA1012, intrinsic viscosity [η]: 0.94 dL/g, Shandong Dongchen New Technology Co., Ltd.) is used.

(B4) A polyamide resin having a glass transition temperature of 120° C. (Amorphous polyamide resin, Product Name: Rilsan® G120, intrinsic viscosity [η]: 0.85 dL/g, Arkema Inc.) is used.

(C) Olefin-Based Copolymer

A maleic anhydride modified ethylene-octene copolymer (Product Name: Fusabond® N493D, DuPont) is used.

(D) Calcium Carbonate

Calcium carbonate ($CaCO_3$, Product Name: 2HB, Omya AG) having an average particle diameter (D50) of 4 μm is used.

Examples 1 to 6 and Comparative Examples 1 to 4

The components set forth above are mixed in amounts as listed in Tables 1 and 2, followed by extrusion molding at 300° C. to prepare a polyamide resin composition in pellet form. Extrusion molding is performed using a twin-screw extruder having L/D=36 and a diameter of 45 mm. The prepared pellets are dried at 80° C. to 100° C. for 4 hours or more and subjected to injection molding at a molding temperature of 320° C. at a mold temperature of 130° C. in a 6 oz. injection molding machine, thereby preparing specimens. The prepared specimens are evaluated as to the following properties. Results are shown in Tables 1 and 2.

Property Evaluation (1) Plating adhesive strength (unit: N/cm): Adhesive strength between a base layer and a plating layer is measured on an injection-molded specimen (injection molded at a molding temperature of 320° C. and a mold temperature of 130° C. in a 6 oz. injection molding machine as discussed above) plated with a 30 μm thick chromium layer and having a size of 10 cm×10 cm×3.2 mm using a tensile tester in accordance with JIS C6481. For measurement of adhesive strength between the base layer and the plating layer, a central portion of the chromium layer is cut and secured to a fixture of the tensile tester and stretched at a peeling rate of 50 mm/min at a right angle with respect to the surface of the plating layer.

(2) Impact resistance (unit: kgf·cm/cm): Notched Izod impact strength is measured on a ⅛" thick notched specimen (injection molded at a molding temperature of 320° C. and a mold temperature of 130° C. in a 6 oz. injection molding machine as discussed above) in accordance with ASTM D256.

(3) Thermal resistance (unit: ° C.): Heat deflection temperature (HDT) is measured under a load of 18.56 $kgf/cm^2$ at a heating rate of 120° C./hr in accordance with ASTM D648.

(4) Fluidity (unit: mm): Spiral flow length is measured on a specimen prepared by subjecting the prepared pellets to injection molding in a 0.5 mm thick spiral mold under conditions of a molding temperature of 330° C., a mold temperature of 130° C., an injection pressure of 1,500 $kg/cm^2$, and an injection rate of 120 mm/s.

(5) Surface appearance (unit: GU): Surface gloss is measured at a reflection angle of 75° on each of the injection-molded specimens prepared in the Examples and Comparative Examples (injection molded at a molding temperature of 320° C. and a mold temperature of 130° C. in a 6 oz. injection molding machine as discussed above) and having a size of 10 cm×10 cm×3.2 mm using a gloss meter (Micro-gloss, BYK Co., Ltd.).

TABLE 1

| | Example | | | | | |
|---|---|---|---|---|---|---|
| | 1 | 2 | 3 | 4 | 5 | 6 |
| (A) (wt %) | 47 | 47 | 47 | 47 | 42 | 42 |
| (B1) (wt %) | 5 | — | — | — | 10 | — |
| (B2) (wt %) | — | 5 | — | — | — | — |
| (B3) (wt %) | — | — | 5 | — | — | — |
| (B4) (wt %) | — | — | — | 5 | — | 10 |
| (C) (wt %) | 8 | 8 | 8 | 8 | 8 | 8 |
| (D) (wt %) | 40 | 40 | 40 | 40 | 40 | 40 |
| Plating adhesive strength | 21 | 22 | 18 | 20 | 22 | 16 |
| Notched Izod impact strength | 6 | 6 | 6 | 6 | 6.8 | 6.5 |
| Heat deflection temperature | 120 | 121 | 130 | 120 | 121 | 115 |
| Spiral flow length | 30 | 32 | 31 | 32 | 36 | 35 |
| Surface gloss | 101 | 102 | 101 | 101 | 101 | 101 |

TABLE 2

| | Comparative Example | | | |
|---|---|---|---|---|
| | 1 | 2 | 3 | 4 |
| (A) (wt %) | 50 | 5 | 57 | 32 |
| (B1)(wt %) | 2 | 47 | 10 | 5 |
| (B2) (wt %) | — | — | — | — |
| (B3) (wt %) | — | — | — | — |
| (B4) (wt %) | — | — | — | — |
| (C) (wt %) | 8 | 8 | 8 | 8 |
| (D) (wt %) | 40 | 40 | 25 | 55 |
| Plating adhesive strength | 8 | 2 | 10 | 11 |
| Notched Izod impact strength | 5 | 10 | 7 | 3 |
| Heat deflection temperature | 128 | 85 | 125 | 135 |
| Spiral flow length | 20 | 45 | 30 | 14 |
| Surface gloss | 85 | 74 | 98 | 54 |

As can be seen from the results, the polyamide resin compositions according to the present invention have good properties in terms of plating adhesion, impact resistance, thermal resistance, and appearance.

In contrast, it could be seen that the polyamide resin composition of Comparative Example 1 prepared using an excess of the aromatic polyamide resin suffers from significant deterioration in plating adhesion and relative deterioration in surface gloss, thus providing poor appearance, and the polyamide resin composition of Comparative Example 2 prepared using an excess of the polyamide resin having a glass transition temperature of 40° C. to 120° C. suffers from deterioration in thermal resistance, surface gloss, and plating adhesion. In addition, the polyamide resin composition of Comparative Example 3 prepared using an excess of the aromatic polyamide resin and a small amount of calcium carbonate suffers from deterioration in plating adhesion, and the polyamide resin composition of Comparative Example 4 prepared using an excess of calcium carbonate suffers from deterioration in impact resistance, appearance, and the like.

It is within the scope of this disclosure for one or more of the terms "substantially," "about," "approximately," and/or the like, to qualify each adjective and adverbs of the foregoing disclosure, to provide a broad disclosure. As an example, it is believed those of ordinary skill in the art will readily understand that, in different implementations of the features of this disclosure, reasonably different engineering tolerances, precision, and/or accuracy may be applicable and suitable for obtaining the desired result. Accordingly, it is believed those of ordinary skill will readily understand usage herein of the terms such as "substantially," "about," "approximately," and the like.

The use of the term "and/or" includes any and all combinations of one or more of the associated listed items.

The figures are schematic representations and so are not necessarily drawn to scale.

Exemplary embodiments have been disclosed herein, and although specific terms are employed, unless otherwise noted, they are to be interpreted in a generic and descriptive sense only and not for purpose of limitation. Also although some embodiments have been described above, it should be understood that these embodiments are provided for illustration only and are not to be construed in any way as limiting the present invention, and that various modifications, changes, alterations, and equivalent embodiments can be made by those skilled in the art without departing from the spirit and scope of the invention. The scope of the present invention should be defined by the appended claims and equivalents thereof.

What is claimed is:

1. A polyamide resin composition comprising:
   about 40 wt % to about 49 wt % of an aromatic polyamide resin comprising a repeat unit represented by Formula 1 and a repeat unit represented by Formula 2:

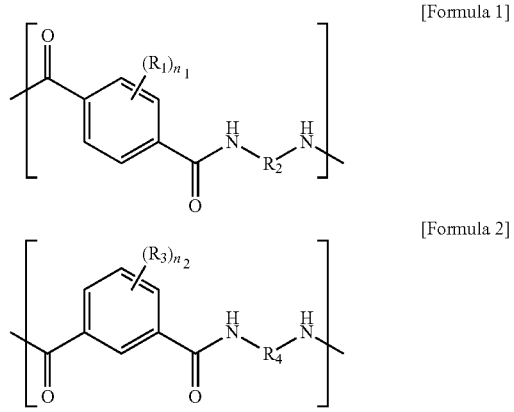

[Formula 1]

[Formula 2]

wherein $R_1$ and $R_3$ are the same or different and are each independently a $C_1$ to $C_6$ hydrocarbon group or a halogen atom; $R_2$ and $R_4$ are the same or different and are each independently a $C_6$ to $C_{12}$ linear or branched alkylene group; and $n_1$ and $n_2$ are the same or different and are each independently an integer of 0 to 4;

about 4 wt % to about 12 wt % of a polyamide resin having a glass transition temperature of about 40° C. to about 120° C.;

about 5 wt % to about 15 wt % of an olefin-based copolymer; and about 35 wt % to about 45 wt % of calcium carbonate, wherein a weight ratio of the aromatic polyamide resin to the polyamide resin having a glass transition temperature of about 40° C. to about 120° C. ranges from about 4:1 to about 10:1, and wherein the polyamide resin composition has a plating adhesive strength of about 13 N/cm to about 30 N/cm, as measured on an injection-molded specimen plated with a 30 µm thick chromium layer and having a size of 10 cm×10 cm×3.2 mm at a peeling rate of 50 mm/min using a tensile tester in accordance with JIS C6481.

2. The polyamide resin composition according to claim 1, wherein the aromatic polyamide resin comprises about 60 mol % to about 80 mol % of the repeat unit represented by Formula 1 and about 20 mol % to about 40 mol % of the repeat unit represented by Formula 2.

3. The polyamide resin composition according to claim 1, wherein the aromatic polyamide resin has a glass transition temperature of about 130° C. to about 150° C.

4. The polyamide resin composition according to claim 1, wherein the polyamide resin having a glass transition temperature of about 40° C. to about 120° C. comprises an aliphatic polyamide resin, an amorphous polyamide resin, and/or an aromatic polyamide resin comprising an aliphatic dicarboxylic acid unit.

5. The polyamide resin composition according to claim 4, wherein the aliphatic polyamide resin comprises polyamide 6, polyamide 11, polyamide 12, polyamide 46, polyamide 66, polyamide 610, polyamide 612, polyamide 1010, polyamide 1012, and/or polyamide 1212.

6. The polyamide resin composition according to claim 1, wherein the olefin-based copolymer comprises an ethylene-α-olefin copolymer; and/or a modified ethylene-α-olefin copolymer obtained by graft polymerization of an α,β-unsaturated dicarboxylic acid and/or an α,β-unsaturated dicarboxylic acid derivative to the ethylene-α-olefin copolymer.

7. The polyamide resin composition according to claim 6, wherein the α,β-unsaturated dicarboxylic acid and/or the α,β-unsaturated dicarboxylic acid derivative comprises maleic acid, maleic anhydride, maleic hydrazide, dichloromaleic anhydride, and/or fumaric acid.

8. The polyamide resin composition according to claim 1, wherein the olefin-based copolymer comprises a maleic anhydride modified ethylene-octene copolymer.

9. The polyamide resin composition according to claim 1, wherein the polyamide resin composition has a notched Izod impact strength of about 4 kgf cm/cm to about 12 kgf cm/cm, as measured on a ⅛" thick specimen in accordance with ASTM D256.

10. The polyamide resin composition according to claim 1, wherein the polyamide resin composition has a heat deflection temperature (HDT) of about 100° C. to about 150° C., as measured under a load of 18.56 kgf/cm² at a heating rate of 120° C./hr in accordance with ASTM D648.

11. A molded article comprising:
   a base layer; and
   a plating layer formed on at least one surface of the base layer,
   wherein the base layer is formed of the polyamide resin composition according to claim 1.

12. The polyamide resin composition according to claim 1, the calcium carbonate having an average particle diameter D50 (a diameter at a distribution rate of 50%) of about 0.05 nm to about 6 μm, as measured using a particle size analyzer.

13. The polyamide resin composition according to claim 1, the polyamide resin composition having a heat deflection temperature (HDT) of about 115° C. to about 135° C., as measured under a load of 18.56 kgf/cm$^2$ at a heating rate of 120° C./hr in accordance with ASTM D648.

* * * * *